Dec. 10, 1968  D. L. CROCKETT ET AL  3,415,998
RADIATION CHOPPER ELEMENT PROVIDING TWO
ALTERNATE RADIATION PATHS
Filed Aug. 3, 1966

*INVENTORS.*
DAVID L. CROCKETT
ROGER L. SPERLING
BY
*Oliver F. Arnett*
ATTORNEY.

United States Patent Office 3,415,998
Patented Dec. 10, 1968

3,415,998
RADIATION CHOPPER ELEMENT PROVIDING
TWO ALTERNATE RADIATION PATHS
David L. Crockett, Minneapolis, and Roger L. Sperling,
St. Paul, Minn., assignors to Honeywell Inc., Minneapolis, Minn., a corporation of Delaware
Filed Aug. 3, 1966, Ser. No. 569,933
9 Claims. (Cl. 250—233)

This invention is concerned with radiation choppers. More particularly, it is concerned with radiation choppers having a rotatable chopper element that alternately establishes two radiation paths.

The invention provides a straight forward radiation chopper that takes advantage of simple mechanical rotary motion. In addition, the configuration of the chopper element is simple and uncomplicated. There is thus provided by this invention a radiation chopper which is easy to make and operate.

This invention may be used in a wide variety of optical systems. For example, it may be used in systems wherein a single broad beam of radiation is allowed to impinge upon the chopper element and is formed into two alternately chopped radiation paths by the chopper element itself. On the other hand, it may also be used in systems wherein two beams of radiation are established prior to their impingement upon the chopper element, either through the use of two separate light sources or some other means of forming two beams of radiation, which are then alternately chopped by the chopper element.

The invention may also be used to alternately chop two radiation beams or establish two radiation paths wherein the radiation in the two paths is of different wavelength characteristics. In this connection, reference is made to copending application of R. N. Schmidt, J. E. Janssen, and R. H. Torborg, Ser. No. 563,451, filed July 7, 1966, entitled Flame Monitoring Method and Apparatus, and assigned to the same assignee as the present invention, wherein a flame monitoring apparatus makes use of this invention for alternately chopping two radiation beams of differing wavelength characteristics.

For the sake of convenience, the invention will be described in detail with reference to only one of the above-mentioned systems as shown in FIGURE 1 of the drawing. This figure is a schematic representation of a system wherein two beams of radiation impinge on the chopper element. The beams are alternately chopped and two discrete radiation paths are alternately established by rotation of the chopper element.

Figure 1:
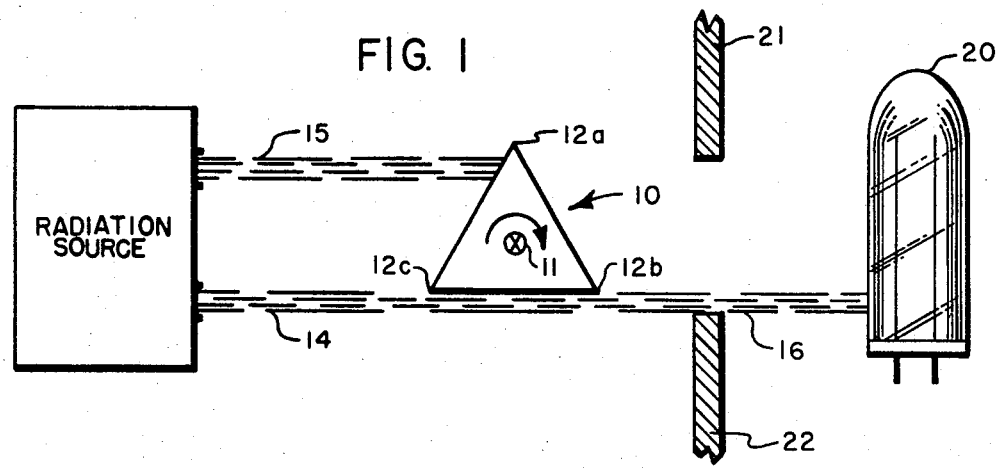

With the above in view, the invention embodies a radiation chopper, capable of alternately establishing two radiation paths, but never simultaneously, wherein a chopper element is supported for rotation about its axis. The chopper element is shaped so as to provide upon rotation a plurality of opaque regions, such as projections, which alternately establish the two desired radiation paths by sequentially allowing and prohibiting the passage of radiation past the chopper element in two discrete paths.

Referring now to the drawings, wherein like reference characters denote corresponding parts, the radiation chopper of this invention includes a rotatable chopper element 10 which is rotatably mounted at its axis 11. Three annularly-spaced projections extending radially from axis 11 and terminating at 12a, 12b and 12c are formed by the vertices of the chopper element. Radiation is shown impinging upon element 10 in the form of two beams 14 and 15. The projection terminating at 12a blocks the passage of beam 15. Due to the shape of element 10, when it is in the position shown in FIGURE 1, the other two projections terminating at 12b and 12c cooperate to allow the passage of beam 14 past element 10. Thus, radiation path 16 is establishing when element 10 is in the position shown in the figure, and light-sensing means 20 is periodically exposed to the chopped radiation in path 16. Light directing means 21 and 22 may be included if desired in order to aid in directing the radiation paths established by chopper element 10 to light-sensitive means 20. A single light-sensing means may be used as shown or two separate sensing means may be used if desired.

Figure 2:
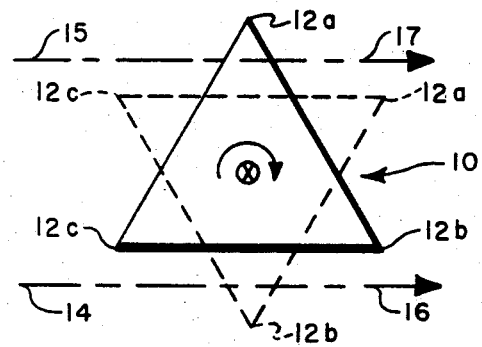
FIGURE 2 shows the chopper element of FIGURE 1 in two of the different positions it assumes during rotation.

Referring to FIGURE 2, chopper element 10 is shown in the same position as shown in FIGURE 1 and is also shown in a second position (dotted lines) assumed during rotation wherein the second radiation path 17 is established by projections 12a and 12c and the passage of beam 14 is blocked by projection 12b. Thus, light-sensing means 20 is also exposed to chopped radiation established in path 17. It can easily be seen from these figures that upon rotation of chopper element 10, radiation paths 16 and 17 will alternately be established for discrete time intervals. However, at no time during the operation of the chopper will both paths be established simultaneously.

Figure 3:
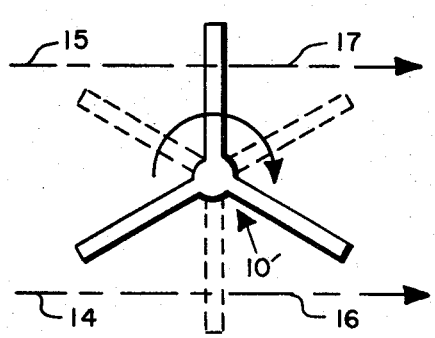
FIGURE 3 shows another configuration of the chopper element in two of the different positions assumed during rotation.

Referring now to FIGURE 3, another configuration of the invention is shown. In this embodiment, element 10' takes the form of a three-vaned structure wherein the vanes correspond to the projections discussed in connection with FIGURES 1 and 2. The chopper element is shown in a first position during rotation corresponding to the position shown in FIGURES 1 and 2 wherein beam 15 is blocked and beam 14 is allowed to pass element 10 thus establishing radiation path 16. Element 10' is also shown (dotted lines) in a second position assumed during rotation wherein beam 14 is blocked thus prohibiting the establishment of path 16 and beam 15 is allowed to pass the chopper element thus establishing path 17.

Figure 4:
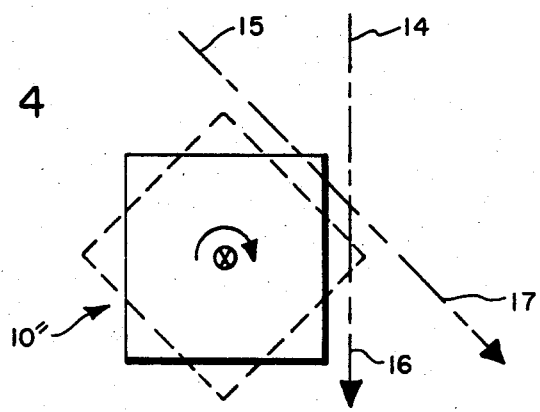
FIGURE 4 shows yet another configuration, also in two of the different positions assumed during rotation.

The embodiments of the invention thus far discussed have been those which are most convenient when two substantially parallel beams of radiation or a single relatively broad beam of radiation is impinged upon chopper element 10. However, the embodiment shown in FIGURE 4 is one which may be conveniently used when two separate beams of radiation, which are not substantially parallel are to be alternately chopped. The operation of the embodiment in FIGURE 4 is the same as that for the embodiment discussed in connection with FIGURES 1 through 3.

Many other configurations may also be used for element 10. For example, a chopper element having a configuration of a pentagon has been found desirable in some cases. The configuration can best be generally described as any body having at least three annularly-spaced projections extending from the axis of the body. Obviously, additional pairs of beams can be alternately chopped by the choppers disclosed when the beams are suitably positioned. Additionally, one path may be established for a longer time than the other is by positioning it farther from the axis of rotation of the chopper body than the other is positioned.

What is claimed is:

A radiation chopper, adapted to be used in combination—

1. A radiation chopper, adapted to be used in combination with an apparatus wherein radiation is alternately required in two discrete paths at separate times, comprising:

a chopper element rotatable about an axis for alternately establishing the two radiation paths by blocking the passage of radiation impinging upon a portion of said element in at least one of the paths;

support means rotatably mounting and positioning said element in a predetermined relationship with respect to the impinging radiation;

said element having at least three, annularly-spaced projections extending radially from said axis, said projections being constructed and arranged so that, sequentially during the rotation of said element, a first of said projections blocks radiation from the first path while a first pair of said projections establish the second path and subsequently one of said first pair of projections blocks radiation from the second path while a second pair of said projections establish the first path.

2. The radiation chopper defined in claim 1 wherein said projections are equally spaced around said axis.

3. The radiation chopper defined in claim 1 wherein said projections are of equal length.

4. The radiation chopper defined in claim 1 wherein said chopper element, in cross section, substantially perpendicular to said axis, is an equilateral geometrical figure.

5. The radiation chopper as defined in claim 4 wherein said cross section forms an equilateral triangle.

6. The chopper as defined in claim 1 wherein said projections are vane-like in structure.

7. The chopper as defined in claim 1 wherein said projections are those portions of a geometrical figure that include the vertices thereof.

8. The chopper as defined in claim 1 wherein there is included means for impinging radiation upon said chopper element.

9. The chopper as defined in claim 7 wherein the radiation impinging upon said chopper element in the two paths has different wavelength characteristics.

References Cited

UNITED STATES PATENTS

| 2,709,751 | 5/1955 | Meyer | 250—233 X |
| 3,055,263 | 9/1962 | Kuehne | 250—233 X |
| 3,116,886 | 1/1964 | Kuehne | 250—220 X |

JAMES W. LAWRENCE, *Primary Examiner.*

V. LAFRANCHI, *Assistant Examiner.*

U.S. Cl. X.R.

250—220; 350—275